US010178316B2

(12) United States Patent
Shamir et al.

(10) Patent No.: US 10,178,316 B2
(45) Date of Patent: Jan. 8, 2019

(54) STABILIZATION AND DISPLAY OF REMOTE IMAGES

(71) Applicant: ELBIT SYSTEMS LTD., Haifa (IL)

(72) Inventors: Hanan Shamir, Haifa (IL); Asaf Ashkenazi, Haifa (IL); Eliyahu Tell, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 179 days.

(21) Appl. No.: 15/326,673

(22) PCT Filed: Jul. 17, 2015

(86) PCT No.: PCT/IB2015/001199
§ 371 (c)(1),
(2) Date: Jan. 17, 2017

(87) PCT Pub. No.: WO2016/009268
PCT Pub. Date: Jan. 21, 2016

(65) Prior Publication Data
US 2017/0208251 A1    Jul. 20, 2017

(30) Foreign Application Priority Data
Jul. 17, 2014   (IL) .......................................... 233684

(51) Int. Cl.
*H04N 5/00*    (2011.01)
*H04N 5/232*   (2006.01)
(Continued)

(52) U.S. Cl.
CPC ......... *H04N 5/23267* (2013.01); *B64D 47/08* (2013.01); *G01C 21/165* (2013.01);
(Continued)

(58) Field of Classification Search
CPC ... H04N 5/00; H04N 7/18; G06K 9/00; G06T 7/00
See application file for complete search history.

(56) References Cited

U.S. PATENT DOCUMENTS

| 4,717,958 A | 1/1988 | Gal et al. |
| 4,959,725 A | 9/1990 | Mandle |

(Continued)

FOREIGN PATENT DOCUMENTS

| GB | 2481027 | 12/2011 |
| JP | 2008227807 | 9/2008 |
| WO | 2013127631 | 9/2013 |

OTHER PUBLICATIONS

Mark D Pritt et al., "Stabilization and georegistration of aerial video over mountain terrain by mean of lidar" Geoscience and Remote Sensing Symposium, IEEE International, Jul. 24, 2011, pp. 4046-4049.

(Continued)

*Primary Examiner* — Maryam A Nasri
(74) *Attorney, Agent, or Firm* — A. C. Entis-IP Ltd.; Allan C. Entis; Kenichi N. Hartman

(57) ABSTRACT

Apparatus for remote imaging of a terrestrial area, the apparatus comprising: a camera array having a focal length f and a photosensor comprising photosensor pixels characterized by a photosensor pixel pitch P on which light from the terrestrial area is imaged from an operating distance A from the terrestrial area to acquire an image of the terrestrial area; an orthographic image of the terrestrial area having image pixels that image features in the terrestrial area; a terrain map that provides elevation for features in the terrestrial area imaged on the image pixels of the orthographic image; a controller that registers the image of the terrestrial area to the orthographic image responsive to the terrain data; wherein elevation provided by the terrain map (Continued)

has an uncertainty $\Delta\beta$ that satisfies a constraint $P \geq \Delta e \cdot f \cdot \sin \alpha/A$, where $\alpha$ is a maximum oblique angle at which the camera array images the terrestrial area so that registration of the image of the terrestrial area to the orthographic image has an accuracy better than or about equal to the pixel pitch.

20 Claims, 6 Drawing Sheets

(51) Int. Cl.
| | | |
|---|---|---|
| G06T 7/33 | (2017.01) |
| B64D 47/08 | (2006.01) |
| G01C 21/16 | (2006.01) |
| G05D 1/00 | (2006.01) |
| G06K 9/00 | (2006.01) |
| G06K 9/46 | (2006.01) |
| H04N 5/353 | (2011.01) |
| H04N 7/18 | (2006.01) |

(52) U.S. Cl.
CPC ......... G05D 1/0094 (2013.01); G06K 9/0063 (2013.01); G06K 9/4604 (2013.01); G06T 7/33 (2017.01); H04N 5/2328 (2013.01); H04N 5/3532 (2013.01); H04N 7/18 (2013.01); G06T 2207/10032 (2013.01); G06T 2207/30181 (2013.01)

(56) References Cited

U.S. PATENT DOCUMENTS

| | | | |
|---|---|---|---|
| 5,259,040 A | 11/1993 | Hanna | |
| 5,438,361 A | 8/1995 | Coleman | |
| 5,504,523 A | 4/1996 | Wight et al. | |
| 5,629,988 A | 5/1997 | Burt et al. | |
| 5,751,838 A | 5/1998 | Cox et al. | |
| 5,903,307 A | 5/1999 | Hwang | |
| 6,307,959 B1 | 10/2001 | Mandelbaum et al. | |
| 6,738,099 B2 | 5/2004 | Osberger | |
| 7,133,067 B1* | 11/2006 | Claus | H04N 5/23248 348/208.3 |
| 7,548,256 B2 | 6/2009 | Pilu | |
| 7,705,884 B2 | 4/2010 | Pinto et al. | |
| 7,773,116 B1 | 8/2010 | Stevens | |
| 8,111,294 B2 | 2/2012 | Bourgain et al. | |
| 8,238,612 B2 | 8/2012 | Susca et al. | |
| 8,340,400 B2 | 12/2012 | Lukas et al. | |
| 8,531,504 B2 | 9/2013 | Nestares et al. | |
| 2002/0118761 A1 | 8/2002 | Lee | |
| 2008/0195316 A1 | 8/2008 | Krishnaswamy | |
| 2009/0309984 A1 | 12/2009 | Bourgain et al. | |
| 2011/0193978 A1 | 8/2011 | Wu et al. | |
| 2012/0019660 A1 | 1/2012 | Golan et al. | |
| 2012/0127030 A1* | 5/2012 | Arthur | G01S 19/45 342/357.28 |
| 2012/0218409 A1 | 8/2012 | Pritt et al. | |
| 2012/0262587 A1 | 10/2012 | Schmid | |
| 2013/0044228 A1 | 2/2013 | Corey et al. | |
| 2013/0235199 A1 | 9/2013 | Nixon | |
| 2013/0250043 A1* | 9/2013 | Kostrzewski | G02B 5/09 348/36 |
| 2013/0317741 A1 | 11/2013 | Brashear et al. | |
| 2013/0335566 A1 | 12/2013 | Coulter et al. | |
| 2015/0199556 A1* | 7/2015 | Qian | G06K 9/0063 382/215 |

OTHER PUBLICATIONS

Extended European Search Report dated Dec. 7, 2017 for corresponding European application No. 15822073.1 filed Feb. 1, 2017.
Zitova Barbara, Image registration methods: a survey, Image and Vision Computing 21, 2003, pp. 977-1000.
Funkhouser, Thomas "Image Warping" Princeton University C0S 426, (Fall 2000), pp. 1-16.
Irani Michal, Recovery of Ego-Motion Using Region Alignment, Pattern Analysis and Machine Intelligence, IEEE Transactions on (vol. 19, Issue: 3), Mar. 1997, pp. 268-272.
Brown Andrew P., Persistent Electro-Optical/Infrared Wide-Area Sensor Exploitation, Proc. SPIE 8402, Evolutionary and Bio-Inspired Computation: Theory and Applications VI, 840206 (May 1, 2012); doi:10.1117/12.922167.
Sedaghat, Amin, et. al. "Image Matching of Satellite Data Based on Quadrilateral Control Networks" The Photogrammetric Record vol. 27, Issue 140, Dec. 2012, pp. 423-442.
Hol, Jeroen., "Sensor Fusion and Calibration of Inertial Sensors, Vision, Ultra-Wideband and GPS" PhD. Thesis, Linköping University, The Institute of Technology, 2011; Dissertations No. 1368.
International Search Report dated Dec. 1, 2015 for International Application No. PCT/IB2015/001199 filed Jul. 17, 2015.
Karpenko, Alexandre., et. al., "Digital Video Stabilization and Rolling Shutter Correction using Gyroscopes", Standard Tech Report CTSR Mar. 2011, pp. 1-7.
Baker, S., et. al., "Removing Rolling Shutter Wobble", Microsoft Research, Proceedings of the IEEE Conference on Computer Vision and Pattern Recognition, Jun. 2010, pp. 1-8, Inproceedings.
Office Action dated Jul. 14, 2015 for corresponding Israeli application No. 233684 filed Jul. 17, 2014.
Office Action dated Oct. 26, 2016 for corresponding Israeli application No. 233684 filed Jul. 17, 2014.

* cited by examiner

STABILIZATION AND DISPLAY OF REMOTE IMAGES

RELATED APPLICATIONS

The present application is a US National Phase of PCT Application No. PCT/IB2015/001199 filed on Jul. 17, 2015, which claims the benefit under 35 U.S.C. § 119(a)-(d) of Israeli Application 233684 filed Jul. 17, 2014, the disclosure of which is incorporated herein by reference.

TECHNICAL FIELD

Embodiments of the invention relate to stabilizing and displaying images of a scene acquired by a remote camera system.

BACKGROUND

Remote image acquisition by camera systems has become a ubiquitous and invasive feature of modern life. To note a few of the applications to which remote image acquisition is employed, remote camera systems are used to watch our streets, guard the entrances to our buildings, monitor internal venues of our malls, survey global vegetation patterns, track global weather, and guide remote and autonomous piloted ground and airborne vehicles. Remote images of a region of interest (ROI) of an environment acquired by a remote camera system may be processed by a computer system and/or monitored by a human to detect and/or respond to "events of note" that transpire or are encountered in the ROI. An event of note may be any of various events for which a computer system or human may advantageously be expected to provide an active or passive response, such as respectively an overt action or a change of level of attention. An event of note in an ROI imaged by a remote camera may, by way of example, comprise a statistically aberrant event within the ROI, suspicious human or vehicular motion in the ROI, entry of a migrating flock of geese into the ROI, or an encounter of an obstacle in the ROI by a remote piloted or auto-piloted vehicle.

Efficiency of detection for events of note in an ROI responsive to remote images of the ROI may be compromised by artifacts in the images that degrade quality of the images and mask or draw attention away from events of note. Image artifacts in remote ROI images generally increase processing time that computer algorithms require for processing the images to detect images of events of note they may contain, and reduce reliability of results provided by the algorithms. Image artifacts in ROI images displayed as a continuous video sequence on a computer screen for visual monitoring by a human operator may generate not only distortions in the images but also poor registration between consecutive images in the sequence. The distortions and degraded registration tend to accelerate operator fatigue and impair his or her sensitivity for detecting events of note in the ROI that may appear in the images.

Image artifacts may be introduced into remote images of an ROI by features associated with the remote camera system that acquires the images and how the remote camera system is configured and used to image the ROI. Image artifacts may include image distortions generated by camera angle, optical system aberrations, and defocus blur.

For camera systems mounted to a moving platform, such as a ground or an airborne vehicle, to acquire surveillance images of an ROI, image artifacts may be exacerbated and additional image artifacts introduced into the remote images by motion of the camera system during acquisition of the remote images. Motion artifacts can be generated by planned motion of the platform and/or disturbances to planned motion of the platform that erratically shift the remote camera system field of view (FOV) relative to the ROI.

Planned motion of a ground vehicle comprises intended motion of the ground vehicle along a planned ground route. Disturbances to the ground vehicle motion may be generated by vibrations of its power train or by unanticipated lurching and bouncing of the ground vehicle as it travels along the planned route. For the increasingly frequent situation in which a remote camera system is mounted to an airborne vehicle, such as an unmanned aerial vehicle (UAV), an airship, or an aerostat, for weather, environmental, or security surveillance monitoring, planned motion of the airborne vehicle comprises motion along an intended flight path. For a heliostat, which is tethered, an intended flight path is considered to include hovering in a region of sky to which motion of the heliostat is limited by a tether. Disturbance to the planned motion may be generated for example by vibrations of the airborne vehicle propulsion system, and/or air turbulence.

To moderate motion artifacts generated in remote images of an ROI acquired by an airborne remote camera system, the remote camera system is generally mounted to an airborne vehicle by a two or three axis gimbaled mount. An inertial measurement unit (IMU) provides measurements of displacement of the platform along optionally three orthogonal "displacement axes", and rotation of the platform about, optionally three orthogonal "rotation axes". The measurements are processed to determine "dead reckoning" position and orientation of the platform. A controller controls the gimbaled mount responsive to the measurements of position and orientation to counter motion of the platform and stabilize the location and orientation of the ROI within the camera system FOV. Dead reckoning position and orientation are subject to substantial drift error over time and are typically calibrated to, or "fused with", measurements provided by GNSS (global navigation satellite system) equipment and magnetometers, which may be included in the IMU.

High resolution airborne camera systems may have angular resolutions that are less than or equal to about 20 or 30 microradians and may operate to acquire images of large terrestrial areas equal to or greater than about 1 km square from altitudes of between 5 and 6 km. At an altitude of about 5 km, a high resolution airborne camera system having angular resolution between 20 and 30 microradians may acquire terrestrial images that resolve features on the ground that are separated by as little as 10 and 15 cm. Whereas pedestrian airborne camera systems may be sufficiently stabilized by two or three axes gimbaled mounts such high resolution camera systems conventionally require that their cameras be mounted to particularly robust and fast response gimbaled mounts for stabilizing camera orientation during remote airborne imaging. The gimbaled camera mounts of these systems tend to be mechanically complex, relatively large, massive, and expensive.

For example, a gimbaled camera mount for stabilizing orientation of a high resolution airborne camera for imaging relatively large land areas at a resolution of about 20-30 microradians may weigh in excess of 100 kg-200 kg (kilogram). The gimbaled camera mount generally comprises an IMU sensor that provides measurements of platform translation and rotation and a gimbal system comprising a fast response, high resolution gimbal nested in and supported by a slower, course resolution gimbal. The high resolution gimbal typically provides rapid, fine rotational correction of camera orientation about three orthogonal rotation axes for relatively small angular dynamic ranges of up to about 2°. The coarse gimbal provides slower rotational corrections of camera orientation about the axes for dynamic ranges of tens of degrees.

SUMMARY

An aspect of an embodiment of the invention relates to providing a relatively lightweight, high resolution remote camera system (HICAM) for imaging a relatively large terrestrial area from a moving platform and providing a sequence of digitally stabilized, high resolution images of at least one ROI in the terrestrial area. In an embodiment, HICAM acquires images of the terrestrial area using an, optionally rolling shutter, airborne camera that is not stabilized by a gimbal or that is stabilized by a two axis gimbal. HICAM provides images of the at least one ROI that are stabilized to an accuracy generally provided by a relatively large and heavy airborne imaging system comprising a camera stabilized by a six axes gimbal system.

Digitally stabilizing a sequence of images, such as a sequence of ROI images, in accordance with an embodiment of the invention comprises digitally registering the images so that to within a translation, rotation, and/or magnification, stationary features in images of the sequence of images are substantially congruent. Stabilizing an image refers to registering the image to another image so that to within a translation, rotation, and/or magnification, images of stationary features in the terrestrial area are substantially congruent.

HICAM provides the high resolution stabilized images of the at least one ROI by acquiring a sequence of high resolution images of the terrestrial area and data that provides three dimensional (3D) spatial locations and orientations of HICAM for times at which HICAM acquires the "terrestrial images". In an embodiment, the location and orientation data is updated at relatively high frequency to provide relatively accurate determinations of location and orientation of HICAM at times at which HICAM acquires the terrestrial images. Advantageously, terrestrial images acquired by HICAM are acquired during exposure periods that are sufficiently short to moderate image smear so that location of an image of a landmark in the terrestrial images may be determined with an accuracy less than or equal to about a pitch of pixels in the images. For each ROI of the at least one ROI, HICAM crops each of the terrestrial images in the sequence responsive to the location and orientation data to define a portion of the terrestrial image, hereinafter an "ROI cropped image portion", that images the ROI. HICAM digitally stabilizes the ROI cropped image portions to provide the sequence of stabilized images of the ROI.

Digitally stabilizing the ROI cropped image portions in accordance with an embodiment of the invention comprises warping the terrestrial images responsive to the location and orientation data so that the terrestrial images image the terrestrial area from a substantially same perspective. The warped terrestrial images may also be registered to an orthographic image of at least a portion of the terrestrial area responsive to an associated digital terrain map of the at least portion of the terrestrial area. The orthographic image of the at least a portion of the terrestrial area provides geolocation coordinates, optionally longitude and latitude, for features of the terrestrial area useable as landmarks. The associated terrain map provides elevation data for the landmarks. The orthographic image and associated digital terrain map of a terrestrial area may be referred to as a "reference image set". The ROI cropped image portions in the terrestrial images are registered to an orthographic image and associated terrain map of at least a portion of the terrestrial area in the reference image set to provide the stabilized images of the ROI.

The terrain map optionally provides elevation data for a plurality of landmarks imaged in the orthographic image characterized by accuracy sufficient to locate the landmarks in the terrestrial images to within a distance less than or equal to about a pitch of pixels in a HICAM photosensor that acquires the terrestrial images. By way of example, assume HICAM images a landmark from an altitude "A" and oblique angle, "$\alpha$", on a camera having pixel pitch "P" and focal length "f". If "$\Delta e$" represents accuracy with which the terrain map provides an elevation for the landmark in accordance with an embodiment of the invention, $\Delta e$ may satisfy the constraint $P \geq \Delta e \cdot f \cdot \sin \alpha / A$, or after rearranging $\Delta e \leq A \cdot P / f \cdot \sin \alpha$. If A=6000 m (meters), $\alpha$=30°, f=100 mm (millimeters) and P is 10 μm (micrometers) then $\Delta e$ is may be less than or equal to about 1 m. If the pitch were 2 μm $\Delta e$ would be less than about 20 cm.

By registering images of ROIs in a terrestrial area to a reference image set responsive to frequently updated location and orientation data, HICAM may acquire images of the terrestrial area using an un-stabilized, or a two-axis gimbal stabilized, airborne camera and provide images of the ROIs that are accurately stabilized. In an embodiment of the invention HICAM produces stabilized images of an ROI to an accuracy generally provided by a relatively large and heavy airborne imaging system comprising a camera stabilized by a six axes gimbal system. Optionally stabilization accuracy is equal to or less than a pitch of pixels in the HICAM camera that acquires the images of the terrestrial area.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1A:
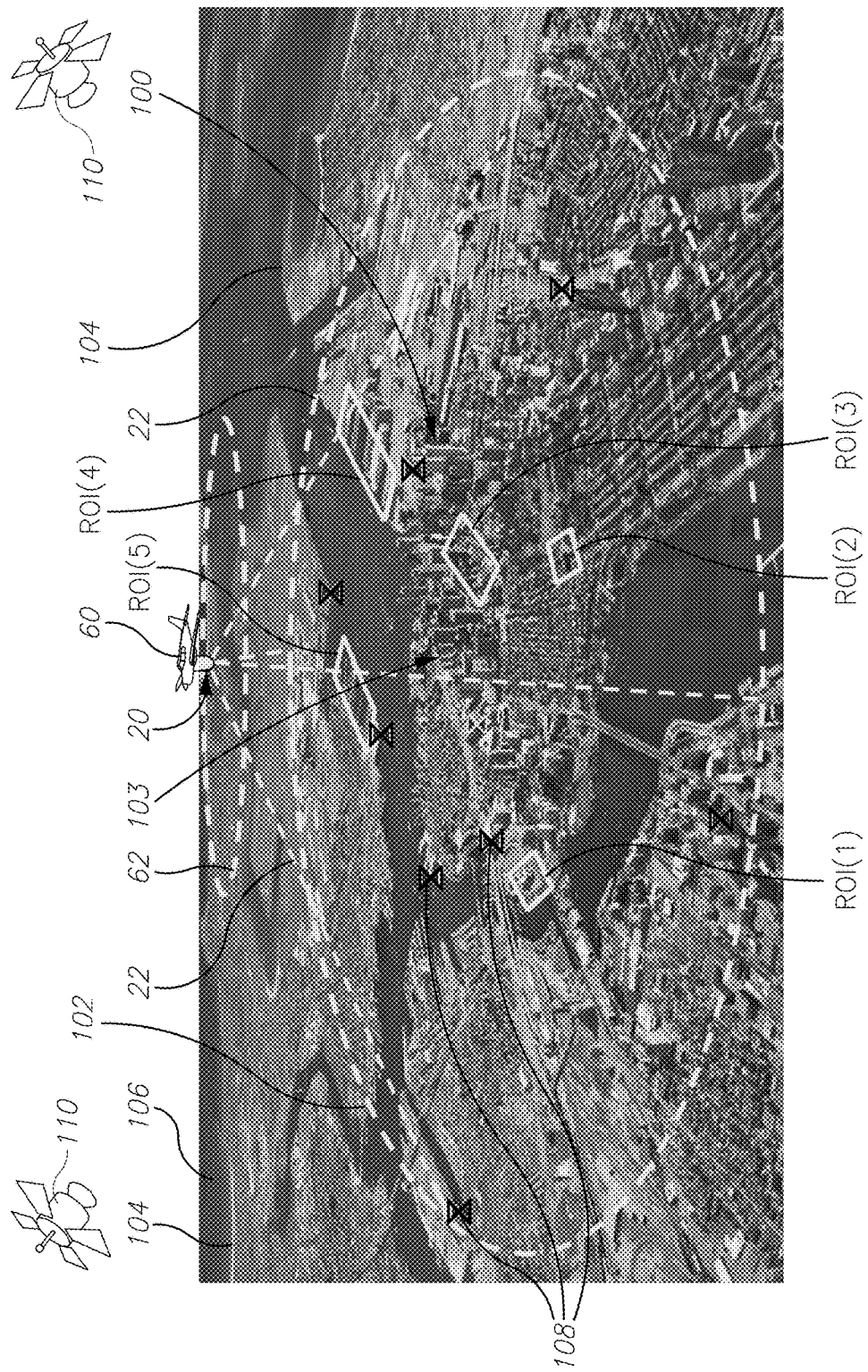
FIG. 1A schematically shows a remote HICAM camera system mounted to an aircraft and imaging a terrestrial area comprising a city for which ROIs and landmarks are indicated, in accordance with an embodiment of the invention.

FIG. 1A schematically shows a surveillance aircraft 60 using a HICAM 20 mounted to the belly of the aircraft to image, by way of example, a terrestrial area 100 comprising a seaside metropolis 102, in accordance with an embodiment of the invention. Aircraft 60 is indicated as flying an optionally circular flight path schematically represented by a dashed circle 62 over terrestrial area 100. (Circle 62 appears elliptical because of the perspective of FIG. 1A) HICAM 20 has a relatively large FOV schematically indicated by lines 22 extending from HICAM 20, and terrestrial area 100 imaged by HICAM 20 has a relatively large extent indicated by a dashed circular boundary 102 and includes not only a metropolis 103 but also a portion of the coastline 104 and ocean 106 along which the metropolis is located. Hourglass shaped icons 108 indicate relatively easily recognized and/or discernible landmarks in terrestrial area 100.

By way of numerical example, aircraft 60 may be flying at altitude of about 5,000 m (meters) and flight path 62 may have a radius equal to about 1500 m. In an embodiment of the invention FOV 22 is characterized by a view angle greater than or equal to about 50°. Optionally, the FOV is characterized by a view angle greater than or about equal to 60°. For view angles of 50° and 60° boundary 102 may have a diameter between about 5,000 m and about 6,000 m HICAM 20 is assumed to be providing stabilized, high resolution images of a plurality of selectable ROIs, ROI(u), 1≤u≤U optionally to operators (not shown) in a ground station tasked with monitoring the ROIs. Optionally, as shown in FIG. 1A, U=5 and HICAM 20 is providing stabilized high resolution images for five selectable ROIs indicated by boundaries ROI(1), ROI(2) . . . ROI(5) in terrestrial area 100. Boundaries of ROI(1), . . . , ROI(5) are shown as rectangles for convenience of presentation and ROIs may of course have boundaries that are other than rectangular and the boundaries may for example be circular, triangular or irregular. Labels ROI(1), . . . , ROI(5) used to designate particular ROIs may be used to refer to respective boundaries delimiting the ROIs. HICAM 20 is assumed to be receiving navigation signals from a satellite navigation system (GNSS) such as the global positioning system (GPS) represented by satellites 110. Signals generated by GNSS 110 and received by HICAM 20 provide 3D spatial coordinates, for example, geolocation plus altitude, for location of HICAM 20 relative to features in terrestrial area 100.

Figure 1B:
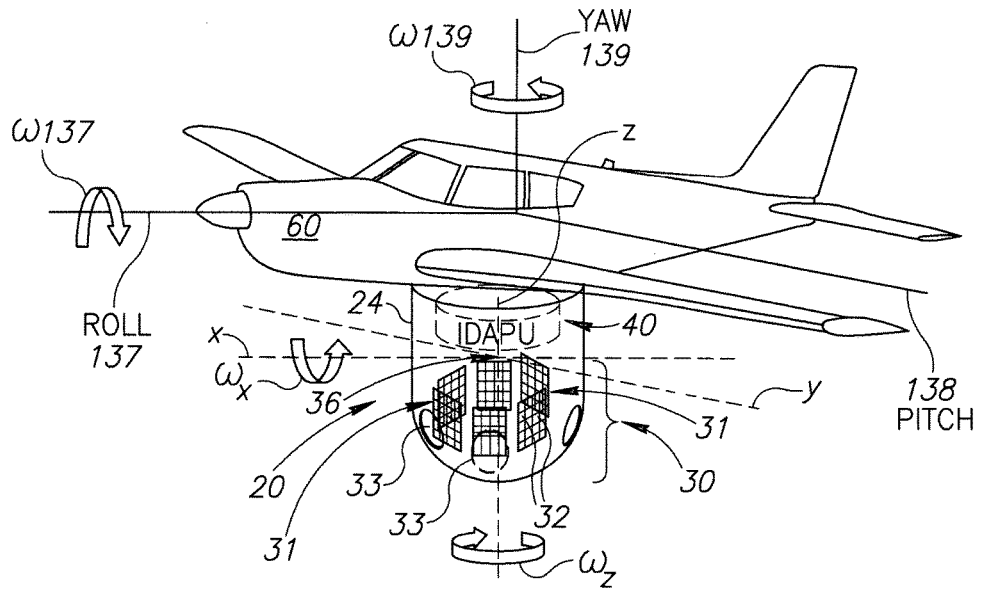
FIG. 1B schematically shows an enlarged image of the aircraft and a pod housing HICAM, in accordance with an embodiment of the invention.
Figure 1C:
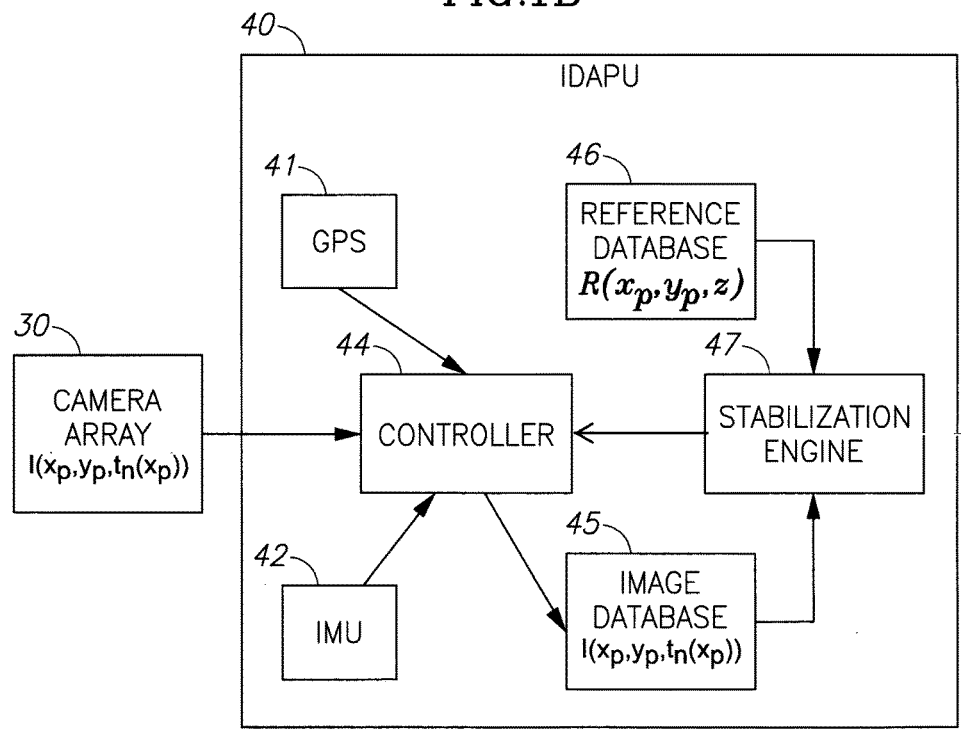
FIG. 1C schematically shows a block diagram of the HICAM shown in FIG. 1B, in accordance with an embodiment of the invention.

FIG. 1B schematically shows an enlarged view of aircraft 60 and HICAM 20. HICAM 20 optionally comprises an aircraft mounting pod 24 housing a camera array 30 that acquires images of terrestrial area 100 and an image data acquisition and processing unit (IDAPU) 40 that processes the images to provide stabilized images of ROIs in the terrestrial area, in accordance with an embodiment of the invention. FIG. 1C shows a schematic block diagram of HICAM 20.

Camera array 30 may comprise a plurality of photosensors 31 having pixels 32, and imaging optics, schematically represented by a collecting lens 33, for each photosensor. Optics 33 associated with a given photosensor 31 collects light from a terrestrial area, such as terrestrial area 100, imaged by HICAM 20 and images the accumulated light on the given photosensor 31. In an embodiment of the invention, camera array 30 is a relatively small lightweight camera array comprising a relatively large number of small pixels 32 that provide the camera array with relatively large FOV 22 (FIG. 1A). In an embodiment, FOV 22 is characterized by a view angle greater than or equal to about 50°. Optionally, the FOV is characterized by a view angle greater than or about equal to 60°. In an embodiment of the invention, a total number of photosensor pixels 32 comprised in photosensors 31 of camera array 30 is greater than or equal to about $10^9$. Optionally, the number of photosensor pixels 32 is equal to or greater than about $5 \times 10^9$. Optionally, photosensor pixels 32 are characterized by a pitch less than or equal to about 10 μm (micrometers). In an embodiment, the pitch is less than or equal to about 3 μm.

Camera array 30 may operate in a rolling shutter imaging mode to acquire images of terrestrial area 100. In the rolling shutter mode adjacent lines, optionally rows, of photosensor pixels 32 in photosensor 31 are sequentially exposed to light from the terrestrial area and each line of pixels 32 is substantially immediately read out after its exposure. Photosensor pixels 32 in a given photosensor 31 are assumed to be located by row and column "photosensor pixel coordinates", $x_p$ and $y_p$ respectively, in the photosensor. Pixels 32 having a same $x_p$ coordinate are located in a same row of pixels and are exposed to light from terrestrial area 100 at substantially a same time and are read out during a same readout period. An n-th image of terrestrial area 100 acquired by camera array 30 may then be represented by $I(x_p,y_p,t_n(x_p))$, where $t_n(x_p)$ is a time at which image data used to generate the n-th image acquired by photosensor pixels having a same photosensor pixel row coordinate $x_p$ are exposed to light from terrestrial area 100. Generating the n-th image may comprise processing the image data from the different rows of pixels using any of various methods known in the art to compensate for image shear generated by the rolling shutter imaging mode. An n-th image of a given ROI(u), imaged in image $I(x_p,y_p,t_n(x_p))$ may be represented by $ROI(u,x_p^*,y_p^*,t_n(x_p^*))$, where $x_p^*,y_p^*$ are image coordinates of a subset of pixels from $I(x_p,y_p,t_n(x_p))$ that provide an image of the given ROI(u).

An n-th image of terrestrial area 100 may be represented by $I(x_p,y_p,t_n)$, where $t_n$ represents a characteristic time, such as an average or suitably weighted average, of times $t_n(x_p)$ that may advantageously be used as a timestamp for the n-th image. Similarly, an n-th image $ROI(u, x_p^*,y_p^*,t_n(x_p^*))$ of a given ROI(u), may be represented by, $ROI(u, x_p^*,y_p^*,t_n^*)$, where $t_n^*$ represents an advantageous timestamp characteristic time of times $t_n(x_p^*)$.

In an embodiment, camera array 30 is mounted to a gimbal system schematically represented by a Cartesian coordinate system 36, which operates to compensate for motion of aircraft 60 and stabilize orientation of the FOV of camera array 30 in a desired direction. Changes in orientation of aircraft 60 are conventionally determined by angles of rotation about roll, pitch and yaw axes 137, 138, and 139 respectively. Optionally, gimbal system 36 is a two axis gimbal system which rotates the camera system about x and z axes that operates to stabilize camera array 30 by compensating for rotation of aircraft 60 respectively about roll axis 137, pitch axis 138, and yaw axis 139 of aircraft 60. Two axis gimbal system 36 provides for rotation of camera array 30 about the x and z axes in directions that are opposite to roll, and yaw angular displacements of aircraft 60 about roll axis 137 and a yaw axis 139. Curled block arrows ω137 and ω139 schematically represent roll and yaw angular displacements of aircraft 60 about roll and yaw axes 137 and 139 respectively. Curled block arrows $\omega_x$ and $\omega_z$ schematically represent angular displacements of camera array 30 about x and z axes by which gimbal system 36 compensates for roll and yaw displacements represented by curled block arrows ω137 and ω139 respectively.

Two axis gimbal system 36 operates to optionally maintain an optic axis (not shown) of camera array 30 aimed at a central region of terrestrial area 100 during flight of aircraft 60 so that the central region is maintained substantially in a center of FOV 22. and the FOV rotates substantially about the central region with an angular velocity equal to that of aircraft 60 around circular flight path 62. Whereas compensatory rotations provided by two axis gimbal system 36 about the x and z-axes are capable of holding FOV 102 of camera array 30 aimed at the center of the terrestrial area, absence of compensatory rotation provided by gimbal system 36 about the y-axis causes yaw of aircraft 60 to disturb aim of FOV 102. In an embodiment, the stabilization of an ROI(u) in accordance with an embodiment of the invention as described below compensates for the disturbance.

IDAPU 40 optionally comprises a GPS receiver 41 and an IMU 42 that acquire data for determining position and orientation of camera array 30 and a controller 44. Controller 44 receives position and orientation data from GPS receiver 41 and IMU 42 and associates the data with images $I(x_p, y_p, t_n(x_p))$ acquired by camera array 30. Position and orientation data provided by GPS receiver 41 and IMU 42 are used, as discussed below, to stabilize images of ROIs, ROI(u, $x_p^*, y_p^*, t_n(x_p^*)$) in $I(x_p, y_p, t_n(x_p))$. Associating is optionally achieved by time stamping the data and images with times at which they are respectively acquired. For example, voltage readout values for photosensor pixels 32 may be time stamped with an acquisition time, $t_n(x_p)$, of the pixel row to which they belong. Data acquired by sampling signals generated by IMU 42 may be time stamped with the sampling time. IDAPU 40 also comprises an image database 45 that stores images acquired by camera array 30 and position and orientation data associated with the images.

In an embodiment of the invention, IDAPU 40 comprises a reference database 46 that stores a reference image set $\mathcal{R}(\alpha_p, \nu_p, \mathcal{Z})$ of terrestrial area 100. Reference image set $\mathcal{R}(\alpha_p, \nu_p, \mathcal{Z})$ may comprise an orthographic image OI($\alpha_p, \nu_p$) of at least a portion of the terrestrial area 100 and an associated terrain map TM($\alpha_p, \nu_p, \mathcal{Z}$). Variables $\alpha_p$ and $\nu_p$ are image coordinates of pixels in orthographic image OI($\alpha_p, \nu_p$). Image coordinates $\alpha_p$ and $\nu_p$ are associated with geolocation coordinates $\mathcal{X}$ and $\mathcal{Y}$ respectively, optionally, latitude and longitude, that geographically locate a feature, such as a landmark 108 imaged by an image pixel in OI($\alpha_p, \nu_p$) at image coordinates $\alpha_p$ and $\nu_p$. The associated terrain map TM($\alpha_p, \nu_p, \mathcal{Z}$) provides a geographic elevation, $\mathcal{Z}$, for a feature imaged in orthographic image OI($\alpha_p, \nu_p$) at image coordinates $\alpha_p, \nu_p$.

IDAPU 40 optionally comprises a stabilization engine 47. In an embodiment of the invention, stabilization engine 47 warps images $I(x_p, y_p, t_n(x_p))$ of terrestrial area 100 acquired by camera array 30 that are stored in image database 45 to compensate for motion of aircraft 60 responsive to location and orientation data provided by GPS 41 and IMU 42. The stabilization engine may register the warped $I(x_p, y_p, t_n(x_p))$ image to an orthographic image and associated terrestrial image of at least a portion of terrestrial area 100 so that images of landmarks in $I(x_p, y_p, t_n(x_p))$ are substantially congruent to images of landmarks in the orthographic image. Stabilization engine 47 crops images $I(x_p, y_p, t_n(x_p))$ of terrestrial area 100 acquired by camera array 30 as described below that are stored in image database 45 to provide ROI images ROI(1, $x_p^*, y_p^*, t_n(x_p^*)$), . . . , ROI(5, $x_p^*, y_p^*, t_n(x_p^*)$), for ROI(1) . . . ROI(5) respectively. It is noted that whereas in FIG. 1C stabilization engine 47 is shown separate from controller 44, the stabilization engine may be comprised in the controller, and may for example be an executable instruction set comprised in the controller.

In an embodiment of the invention, cropping may be performed responsive to position and orientation data provided by GPS 41 and IMU 42, and data provided by orthographic image OI($\alpha_p, \nu_p$) and/or terrain map TM($\alpha_p, \nu_p, \mathcal{Z}$), as well as data provided by a user of HICAM 20 defining ROI(1) . . . ROI(5). By way of example, an ROI cropped image portion of a terrestrial image $I(x_p, y_p, t_n(x_p))$ may be defined using a projection function, optionally using 3D spatial location coordinates—that is geolocation and elevation coordinates—for corners of the ROI. Each of the ROI corners is projected by a reverse ray tracing process onto image $I(x_p, y_p, t_n(x_p))$ to determine image coordinates ($x_p^*, y_p^*$) of image pixels in $I(x_p, y_p, t_n(x_p))$ on which the corners are imaged. The coordinates of the image pixels are used to determine boundaries to which the terrestrial image should be cropped to define an image ROI(u, $x_p^*, y_p^*, t_n(x_p^*)$) of the ROI. Projection is performed using location and orientation of HICAM 20 at times $t_n(x_p^*)$ determined responsive to location and orientation data acquired by GPS receiver 41 and an IMU 42 and data provided by orthographic image OI($\alpha_p, \nu_p$) and/or terrain map TM($\alpha_p, \nu_p, \mathcal{Z}$).

Subsequent to cropping, stabilization engine 47 stabilizes images ROI(1, $x_p^*, y_p^*, t_n(x_p^*)$), . . . , ROI(5, $x_p^*, y_p^*, t_n(x_p^*)$) responsive to reference image set $\mathcal{R}(\alpha_p, \nu_p, \mathcal{Z})$ stored in reference data base 46 and position and orientation data stored in data base 45 to provide stabilized images of ROI(1), . . . , ROI(5). As discussed below, stabilizing images ROI(u, $x_p^*, y_p^*, t_n(x_p^*)$) for a given ROI(u) comprises registering the images to at least a portion of OI($\alpha_p, \nu_p$). An n-th stabilized image of an ROI(u) at a time $t_n^*$ provided by stabilization engine 47 may be represented by WROI(u, $\alpha_p, \nu_p, t_n^*$), where as noted above, $t_n^*$ represents an advantageous timestamp characteristic of times $t_n(x_p^*)$.

Figure 1D:
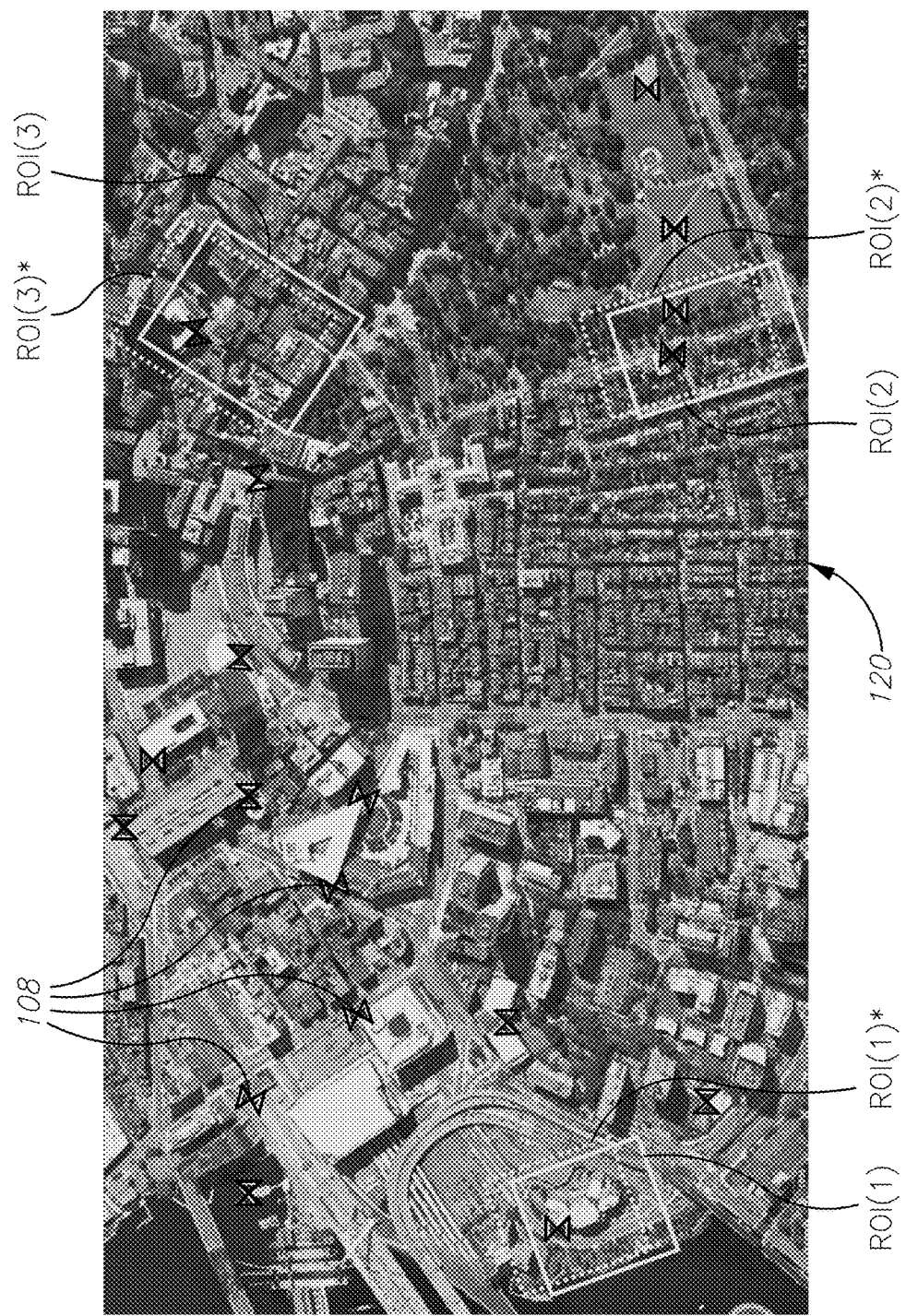
FIG. 1D schematically shows an image of a region of the terrestrial area shown in FIG. 1A and how images of ROIs may be distorted by motion artifacts.

FIG. 1D schematically shows an image 120 of a portion of an image $I(x_p, y_p, t_1(x_p))$ of terrestrial area 100 acquired by HICAM 20 camera array 30 at a timestamp $t_1$ that includes images of ROI(1), ROI(2), and ROI(3) shown in FIG. 1A. Image 120 is an image of a region of terrestrial area 100 following processing of image data acquired at times $t_1(x_p)$ by rows of pixels 32 to substantially compensate for image shear generated by delays between exposure periods of adjacent rows of pixels 32.

Boundaries ROI(1)*, ROI(2)*, ROI(3)* in image 120 schematically indicate boundaries of ROI(1), ROI(2), ROI (3) in a subsequent image of the portion of terrestrial area 100 shown in image 120 acquired at a time $t_2$ by HICAM 20. Boundaries ROI(1)*, ROI(2)*, ROI(3)* may, as indicated in FIG. 1D, be displaced, rotated, and/or distorted with respect to solid line boundaries defining ROI(1), ROI(2), ROI(3). The displacements, rotations and/or distortions may be generated by motion of aircraft 60, such as changes in aircraft location, changes in roll, pitch, and/or yaw about axes 137, 138, and/or yaw 138 respectively, and/or structural and/or operational features of camera array 30.

Were regions indicated by solid boundaries of ROIs ROI(1), ROI(2), ROI(3) in image 120 acquired at time $t_1$ and the same regions of the subsequent image acquired at time $t_2$ transmitted to provide operators tasked with monitoring ROIs, ROI(1), ROI(2), ROI(3) with images of the ROIs, the operators would experience time dependent displacements and distortions in the images they were monitoring. Whereas gimbal system 36 operates to moderate magnitude of the displacements and distortions to stabilize the images, stabilization engine 47 operates to improve stabilization beyond that provided by gimbal system 47, in accordance with an embodiment of the invention.

In the above description, all components of HICAM 20 are shown and described as being housed in a same aircraft mounting pod 24, however, practice of the invention is not limited to a "centralized" HICAM in which all or substantially all of the HICAM components are in a same mounting pod. A HICAM similar to HICAM 20, in accordance with an embodiment of the invention, may have a distributed configuration with components at different locations. For example, reference data base 46 may be located in a ground station or an airborne pod attached to an aircraft different from aircraft 60. And Image data base 45 or stabilization engine 47 may be located in a ground station or aircraft pod different from the ground station or aircraft pod in which reference database 46 is located. Components of a HICAM according to an embodiment of the invention similar to HICAM 20 may be at least partially cloud based.

Figure 2A:
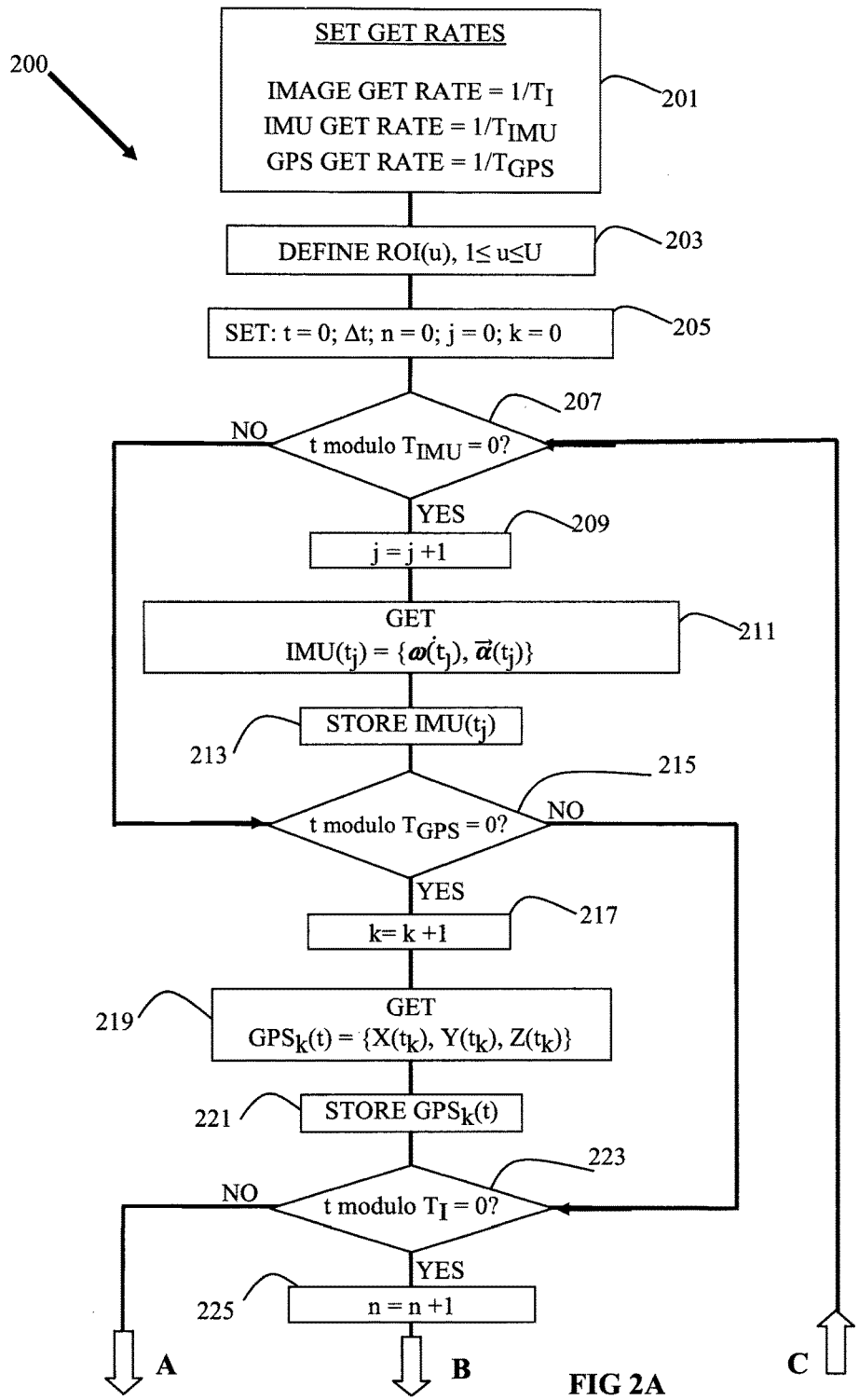
FIGS. 2A and 2B shows a flow diagram describing a procedure that HICAM implements to acquire and stabilize terrestrial images in accordance with an embodiment of the invention.
Figure 2B:
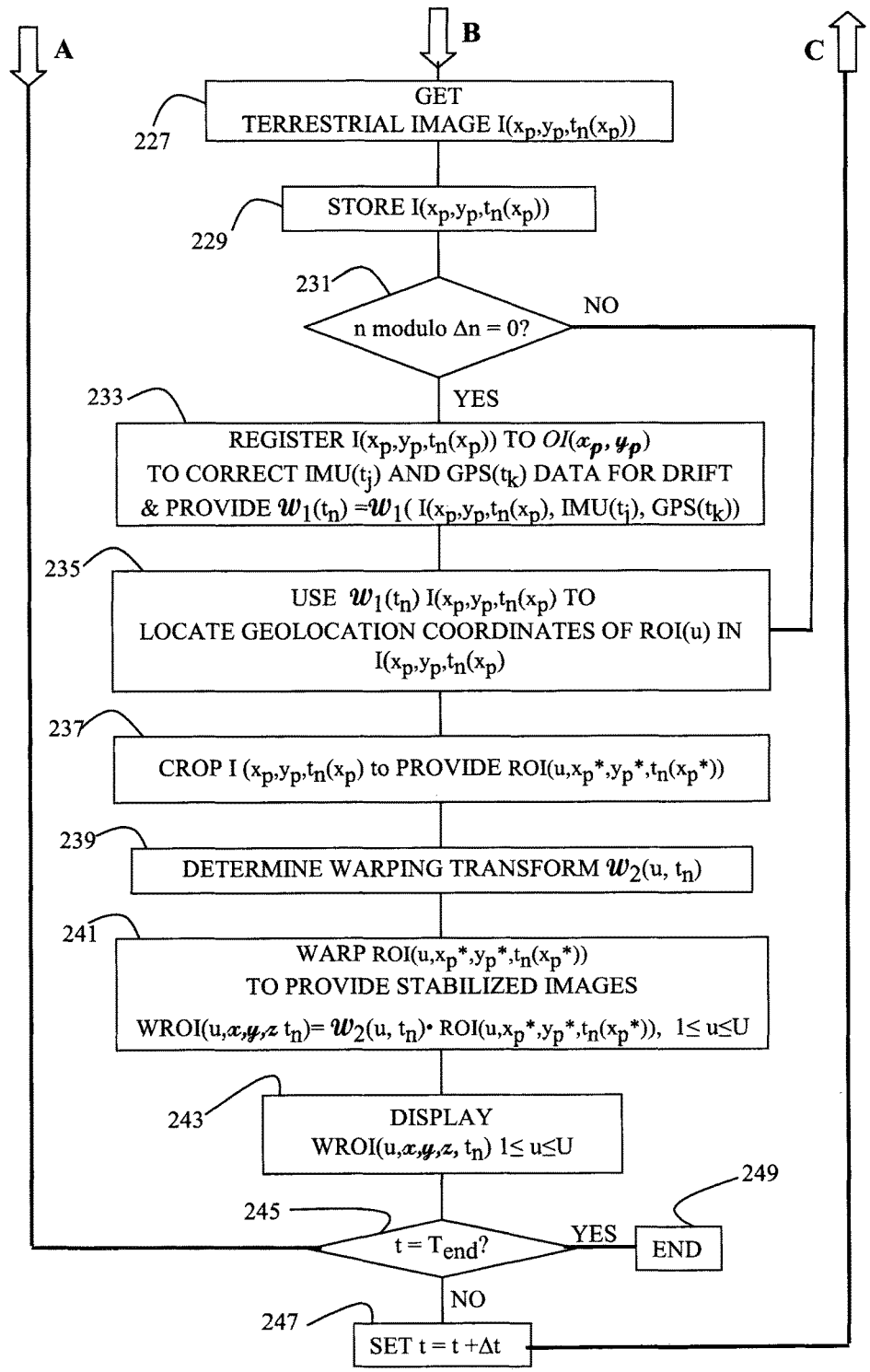

Operation of HICAM 20 and IDAPU 40 in acquiring and stabilizing images of ROI(1), . . . , ROI(5) during flight of aircraft 60 is discussed with reference to a flow diagram of an image acquisition and stabilization algorithm 200 in accordance with an embodiment of the invention shown in FIGS. 2A and 2B.

In a block 201 frequencies, also referred to as "get rates", are determined at which HICAM 20 acquires images of terrestrial area 100 and data relevant for stabilizing images of ROIs in the terrestrial area. Optionally, the get rates comprise an image get rate $1/T_1$, an IMU get rate $1/T_{IMU}$, and a GPS get rate $1/T_{GPS}$. Image get rate $1/T_1$ is a frequency at which images of terrestrial area 100 are acquired and $T_1$ is a period between acquisitions of the images. Similarly, $1/T_{IMU}$ and $1/T_{GPS}$ are frequencies, and $T_{IMU}$ and $T_{GPS}$ are corresponding periods at which signals generated by IMU 42 and GPS receiver 41 are sampled to provide data used in stabilizing images of ROIs, ROI(1), ROI(5), in accordance with an embodiment of the invention. When sampled, signals generated by IMU 42, optionally provide data for linear acceleration of HICAM 20 along three, optionally orthogonal, axes, angular acceleration about three optionally orthogonal axes of rotation, and derived functions of the accelerations. The derived functions may for example include integrals of the acceleration, that provide velocities and "dead reckoning" position and orientation of camera array 30.

In an embodiment of the invention, image get rate $1/T_1$ is equal to or greater than about 3 Hz. In an embodiment of the invention, get rate $1/T_{IMU}$ is greater than or equal to about twice a frequency that characterizes motion of HICAM 20 due to vibration of aircraft 60 and/or atmospheric turbulence. Get rate $1/T_{IMU}$ may, for example be a frequency between about 100 Hz and 200 Hz, which is generally greater by a factor of at least 2 than typical frequencies that characterize vibrations encountered by HICAM 20 as a result of being mounted to an airborne platform such as aircraft 60.

Optionally, HICAM 20 samples GPS ranging signals provided by GPS receiver 41 at a get rate $1/T_{GPS}$ equal to about 1 Hz and an accuracy of about 100 nanoseconds (nsecs). Signals generated by GPS receiver 41 may provide 3D spatial location, and velocity of HICAM 20. The signals may as well comprise a reference 1 pulse per second (1-PPS) clock signal for use in synchronizing operation of functionalities provided by components of HICAM 20 and signals for referencing the functionalities to, optionally, Universal Coordinated Time (UTC).

Optionally, in a block 203, ROIs, ROI(u), 1≤u≤U, in terrestrial area 100, such as exemplary ROIs, ROI(1) ROI(5) shown in FIGS. 1A and 1D, for which stabilized images are to be provided by HICAM 20 are defined. ROIs may be defined by any of various suitable methods. For example, ROIs may be defined by reference to geolocation coordinates available from orthographic image $OI(\alpha_p, \psi_p)$ comprised in reference image set $\mathcal{R}(\alpha_p, \psi_p, \mathcal{Z})$ stored in reference database 46 (FIG. 1C). Optionally, an ROI(u) is rectangular and defined by geolocation coordinates of four corners of ROI. Optionally, an ROI(u) is defined by outlining the ROI(u) in an image of terrestrial area 100 that HICAM generates on a computer video screen using a mouse. Outlining may of course be performed on a touch screen using a finger or stylus.

In a block 205, operating parameters for algorithm 200 may be initialized. The operating parameters may comprise a clock time t synchronize with PPS and UTC signals provided by GPS receiver 41, clock advance step Δt, and counting indices n, j, and k. Counting indices n, j, and k are respectively used for enumerating images of terrestrial area 100 that HICAM 20 camera array 30 acquires, and sampling of signals generated by IMU 42 and GPS receiver 41. Clock time t and indices n, j, and k are optionally initialized to 0.

Optionally, in a decision block 207, HICAM 20 determines whether it is time to sample signal generated by IMU 42 (FIG. 1C) by determining if time t modulo the IMU get period $T_{IMU}$ is equal to zero. If t modulo $T_{IMU}$ is not equal to zero HICAM 20 may proceed to a block 215 discussed below. If on the other hand t modulo $T_{IMU}$ is equal to zero, HICAM 20 proceeds to a block 209 to increase index j by 1, and in a block 211, at a time "$t_j$" substantially equal to time t, controller 44 samples signals generated by IMU 42 to acquire data for determining orientation and 3D spatial location of HICAM 20. Optionally, as noted above, the sampled data comprises a set of values $IMU(t_j)$ comprising angular accelerations $\dot{\omega}$ 137, $\dot{\omega}$ 138, and $\dot{\omega}$ 139 about roll, pitch) and yaw axes 137, 138 and 139 (FIG. 1B) respectively and a vector acceleration $\vec{a}(t_j)$ at time $t_j$. Optionally, in a block 213 data controller 44 (FIG. 1C) stores $IMU(t_j)$ in image database 45.

Optionally, subsequently, in a decision block 215, IDAPU controller 44 determines whether it is time to sample signals generated by GPS receiver 41 (FIG. 1C) by determining if time t modulo the GPS get period $T_{GPS}$ is equal to zero. If t modulo $T_{GPS}$ is not equal to zero HICAM 20 may proceed to a block 223 discussed below. If on the other hand t modulo $T_{GPS}$ is equal to zero, HICAM 20 optionally increases counting index k by 1, and in a block 219 controller 44 at a time $t_k$ substantially equal to t samples signals generated by GPS receiver 41 to acquire data for determining 3D spatial location and orientation of HICAM 20. Optionally, as noted above, the sampled data may comprise a set of values GPS($t_k$) at time $t_k$ that includes a 1PPS synchronization signal, UTC time, and data that may be used to determine 3D location coordinates X($t_k$), Y($t_k$), Z($t_k$) and vector velocity (derivatives of X($t_k$), Y($t_k$), Z($t_k$)) for HICAM 20. In a block 221, controller 44 stores GPS($t_k$) in image database 45.

Optionally, following storage of GPS($t_k$), in an embodiment, in a block 223 controller 44 determines whether it is time to acquire an image of terrestrial area 100 by determining if time t modulo the image get period $T_I$ is equal to zero. If t modulo $T_I$ is not equal to zero HICAM 20 may proceed to a block 237 discussed below. If on the other hand t modulo $T_{GPS}$ is equal to zero, HICAM 20 may, in a block 225, increase counting index n by 1, and at a time substantially equal to t, in a block 227 shown in FIG. 2B, controller 44 operates camera array 30 in a rolling shutter exposure mode to acquire an image $I(x_p, y_p, t_n(x_p))$ of terrestrial area 100. In a block 229 controller 44 optionally stores image $I(x_p, y_p, t_n(x_p))$ in image database 45.

In an embodiment of the invention, controller 44 repeatedly, intermittently or periodically, generates and stores a first warping function $\mathcal{W}(t_n)$ that corrects for drift in 3D spatial location and/or orientation of HICAM 20 determined from IMU($t_j$) and GPS($t_k$) data stored in image database 45. $\mathcal{W}(t_n)$ may be determined by registering an image $I(x_p, y_p, t_n)$, or a portion of image $I(x_p, y_p, t_n)$, to orthographic image $OI(\alpha_p, \psi_p)$ in reference image set $\mathcal{R}(\alpha_p, \psi_p, \mathcal{Z})$ so that a selection of landmarks 108 imaged in $I(x_p, y_p, t_n)$ and $OI(\alpha_p, \psi_p)$ are substantially congruent. The selection of landmarks may be sparse and the registration relatively coarse. By way of example the selection of landmarks and coarse registration may provide a geolocation for a given landmark that is accurate to about fifteen meters. Optionally, registration is performed after controller 44 warps the image to $OI(\alpha_p, \psi_p)$ using 3D spatial location and orientation provided by IMU ($t_j$) and GPS($t_k$) data. Parameters that define the $\mathcal{W}(t_n)$ are functions of magnitude and direction of linear and/or angular drift and may be used to correct the IMU($t_j$) data, GPS($t_k$) data, and/or location and orientation of HICAM 20 determined responsive to the IMU($t_j$) and GPS($t_k$) data.

Whereas the determination of the transform that corrects for drift is described as being made by registering an image $I(x_p, y_p, t_n)$ to orthographic image $OI(\alpha_p, \psi_p)$, in an embodiment of the invention, registration to correct for drift may be made by registering an image $I(x_p, y_p, t_n)$ to a previous image $I(x_p, y_p, t_{n'})$ where n'=(n−Δn)<n. An image $I(x_p, y_p, t_n)$ warped responsive to IMU($t_3$) and GPS($t_k$) data and/or registered to $OI(\alpha_p, \psi_p)$ or a previously acquired image $I(x_p, y_p, t_n')$ may be represented by $I^*(x_p, y_p, t_n)$. It is noted that processing an image $I(x_p, y_p, t_n)$ to determine a drift correction, in accordance with an embodiment of the invention, generates an image $I^*(x_p, y_p, t_n)$.

In an embodiment of the invention, controller 44 performs registration to determine $\mathcal{W}_1(t_n)$ that corrects for drift periodically following acquisition of every Δn images $I(x_p, y_p, t_n(x_p))$ and in a decision block 231 controller 44 determines whether to process image $I(x_p, y_p, t_n(x_p))$ to determine drift correction by determining if n modulo Δn=0. If n modulo Δn is equal to 0, controller 44 optionally proceeds to a block 233 and registers image $I(x_p, y_p, t_n(x_p))$ or a portion thereof to $OI(\alpha_p, \psi_p)$ optionally responsive to elevation data provided by terrain map $TM(\alpha_p, \psi_p, \mathcal{Z})$ to determine drift correction and $\mathcal{W}(t_n)$ that warps $I(x_p, y_p, t_n(x_p))$ to generate image $I^*(x_p, y_p, t_n(x_p))$. $\mathcal{W}_1(t_n)$ is a function of $I(x_p, y_p, t_n(x_p))$, IMU($t_j$), and GPS($t_k$) and may be written $\mathcal{W}_1(t_n) = \mathcal{W}_1(x_p, y_p, t_n(x_p))$, IMU($t_j$), GPS($t_k$)) as shown in block 233. It is noted that images $I^*(x_p, y_p, t_n(x_p))$ are at least coarsely stabilized images. Following registration for drift correction in block 233 and generation of $\mathcal{W}_1(t_n)$, controller 44 may proceed to a block 235. If n modulo Δn is not equal to 0, controller 44 skips block 233 and may proceed to block 235.

In block 235, controller 44 transforms geolocation coordinates that define an ROI(u) to pixel coordinates in image $I(x_p, y_p, t_n(x_p))$ responsive to first warping function $\mathcal{W}_1(t_n)$, or a previously determined $\mathcal{W}_1$ if controller 44 has skipped block 233.

In a block 237 controller 44 crops $I(x_p, y_p, t_n(x_p))$ for each ROI(u) to determine a cropped image portion, ROI(u, $x_p^*, y_p^*, t_n(x_p^*)$), of image $I(x_p, y_p, t_n(x_p))$ responsive to the pixel coordinates define in block 235 that includes substantially all features of ROI(u). Optionally, ROI(u, $x_p^*, y_p^*, t_n(x_p^*)$) is determined using a projection function as discussed above, responsive to $\mathcal{W}_1(t_n)$.

In a block 239 stabilizing engine 47 optionally determines a warping transform $\mathcal{W}_2(u, t_n)$ to transform and stabilize ROI(u, $x_p^*, y_p^*, t_n(x_p^*)$).

Let the image of ROI(u) in orthographic image $OI(\alpha_p, \psi_p)$ be represented by ROI(u, $\alpha_p, \psi_p$). Warping transform $\mathcal{W}_2(u, t_n)$ warps image ROI(u, $x_p^*, y_p^*, t_n(x_p^*)$) to ROI(u, $\alpha_p, \psi_p$) to map image coordinates $x_p^*$, $y_p^*$ to image coordinates $\alpha_p$, $\psi_p$ and thereby provide a warped image WROI(u, $\alpha_p, \psi_p, t_n$) of ROI(u, $x_p^*, y_p^*, t_n(x_p^*)$) registered, and as a result, stabilized to image ROI(u, $\alpha_p, \psi_p$). Images of stationary features of ROI(u) in the warped image WROI(u, $\alpha_p, \psi_p, t_n$) are substantially congruent with images of the stationary features in ROI(u, $\alpha_p, \psi_p$). Warping transform $\mathcal{W}_2(u, t_n)$ may provide a relatively fine registration of ROI(u, $\alpha_p, \psi_p$) to $OI(\alpha_p, \psi_p)$ so that a geolocation of a feature imaged WROI(u, $\alpha_p, \psi_p, t_n$) is characterized by a stabilization level which is equal to or better than about one meter.

$\mathcal{W}_2(u, t_n)$ may be written $\mathcal{W}_2(u, t_n) = \mathcal{W}_2(u, I(x_p, y_p, t_n(x_p)), \text{IMU}(t_j), \text{GPS}(t_k), R(\alpha_p, \psi_p, \mathcal{Z}))$ to explicitly show variables on which it is dependent. $R(\alpha_p, \psi_p, \mathcal{Z})$ in the expression for $\mathcal{W}_2(u, t_n)$ provides both an orthographic reference image ROI($\alpha_p, \psi_p$) for ROI(u, $x_p^*, y_p^*, t_n(x_p^*)$) in terrestrial area 100 and a terrain map $TM(\alpha_p, \psi_p, \mathcal{Z})$ that provides elevation for features in image ROI($\alpha_p, \psi_p$).

Stabilizing engine 47 may use any of various algorithms known in the art for determining $\mathcal{W}_2(u, t_n)$. For example stabilizing engine 47 may determine $\mathcal{W}_2(u, t_n)$ to minimize a least square measure of distance between landmarks 108 (FIGS. 1A and 1D) or minimize joint entropy in a mutual information procedure. Optionally, $\mathcal{W}_2(u, t_n)$ is determined so that it registers ROI(u, $\alpha_p, \psi_p$) of image $OI(\alpha_p, \psi_p)$ to pixel or sub-pixel accuracy. In determining $\mathcal{W}_2(u, t_n)$ it may be assumed that pitch of camera pixels 32 in photosensor 31 of camera array 30 (FIGS. 1B and 1C) and therefore of image pixels in image ROI(u, $x_p^*, y_p^*, t_n(x_p^*)$) is the same as pitch of image pixels in image ROI(u, $\alpha_p, \psi_p$). If the pitches are not the same, suitable binning may be performed to equalize pitches.

Following determination of $\mathcal{W}_2(u, t_n)$ in block 239, optionally in a block 241, controller 44 applies $\mathcal{W}_2(u, t_n)$ to ROI(u, $x_p^*, y_p^*, t_n(x_p^*)$) to generate a warped image WROI (u, $\alpha_p, \psi_p, t_n$) of image ROI(u, $x_p^*, y_p^*, t_n(x_p^*)$) that is stabilized to ROI(u, $\alpha_p, \psi_p$). Operation of $\mathcal{W}_2(u, t_n)$ may be expressed in symbols as shown in block 241:

$$WROI(u, \pmb{x}, \pmb{y}, \pmb{z}, t_n) = \pmb{W}_2(u, t_n) \cdot ROI(u, x_p^*, y_p^*, t_n(x_p^*)), 1 \leq u \geq U.$$

In a block 243, controller 44 optionally transmits stabilized images WROI(u, $\pmb{x_p}$, $\pmb{y_p}$, $t_n$) 1≤u≤U for display on video consoles of operators tasked with monitoring ROIs ROI(u). Because images ROI(u,$x_p^*$,$y_p^*$,$t_n(x_p^*)$) of a given ROI(u) acquired by HICOM 20 are warped to a same orthographic image ROI(u,$\pmb{x_p}$,$\pmb{y_p}$), the sequence of images of the given ROI(u) acquired by HICAM 20 at times $t_n$ that are sequentially displayed on an operator's console are stabilized to each other.

In a decision block 245, controller 44 determines if $t_n$ is equal to a stop time "$T_{end}$". If it is, HICAM 20 proceeds to a block 249 and ends surveilling and imaging terrestrial area 100. If on the other hand $t_n$ is less than stop time "$T_{end}$", in a block 247 controller 44 increases t by Δt and returns to block 207 to determine if it's time to sample signals generated by IMU 42 and acquire a new set of values IMU($t_{j+}$).

Determining a warping transform that registers a first image to a second image to a satisfactory degree of accuracy can be a computationally and time-wise expensive task. The task may be particularly expensive for large images comprising a large number of pixels such as images I(u,$x_p$,$y_p$, $t_n(x_p)$) and ROI(u,$x_p^*$,$y_p^*$,$t_n(x_p^*)$) provided by camera array 30. Terrain map TM($\pmb{x_p}$,$\pmb{y_p}$,$\pmb{z}$) provides elevation data that may be advantageous in moderating complexity and time of computation of warping transforms such as $\pmb{z}_1(u,t_n)$ and $\pmb{z}_2(u,t_n)$.

For example, with respect to warping transform $\pmb{z}_2(u,t_n)$ that operates on ROI(u, $x_p^*$, $y_p^*$, $t_n(x_p^*)$), for a given position and orientation of camera array 30 the elevation data may be used to determine displacement of an image of a feature in ROI(u, $x_p^*$, $y_p^*$, $t_n(x_p^*)$) at image pixel coordinates $x_p^*$,$y_p^*$ from its image coordinates in ROI(u,$\pmb{x_p}$,$\pmb{y_p}$). The elevation displacement may be used as predetermined input to the calculation of $\pmb{W}_2(u,t_n)$ that simplifies the calculation, and reduces its time of execution. Operating conditions and characteristics of HICAM 20 and accuracy of registration of ROI(u, $x_p^*$,$y_p^*$,$t_n(x_p^*)$) to ROI(u,$\pmb{x_p}$,$\pmb{y_p}$) that $\pmb{W}_2(u,t_n)$ is desired to provide, may generate a constraint on accuracy of elevation data provided by TM($\pmb{x_p}$,$\pmb{y_p}$,$\pmb{z}$).

Figure 3:
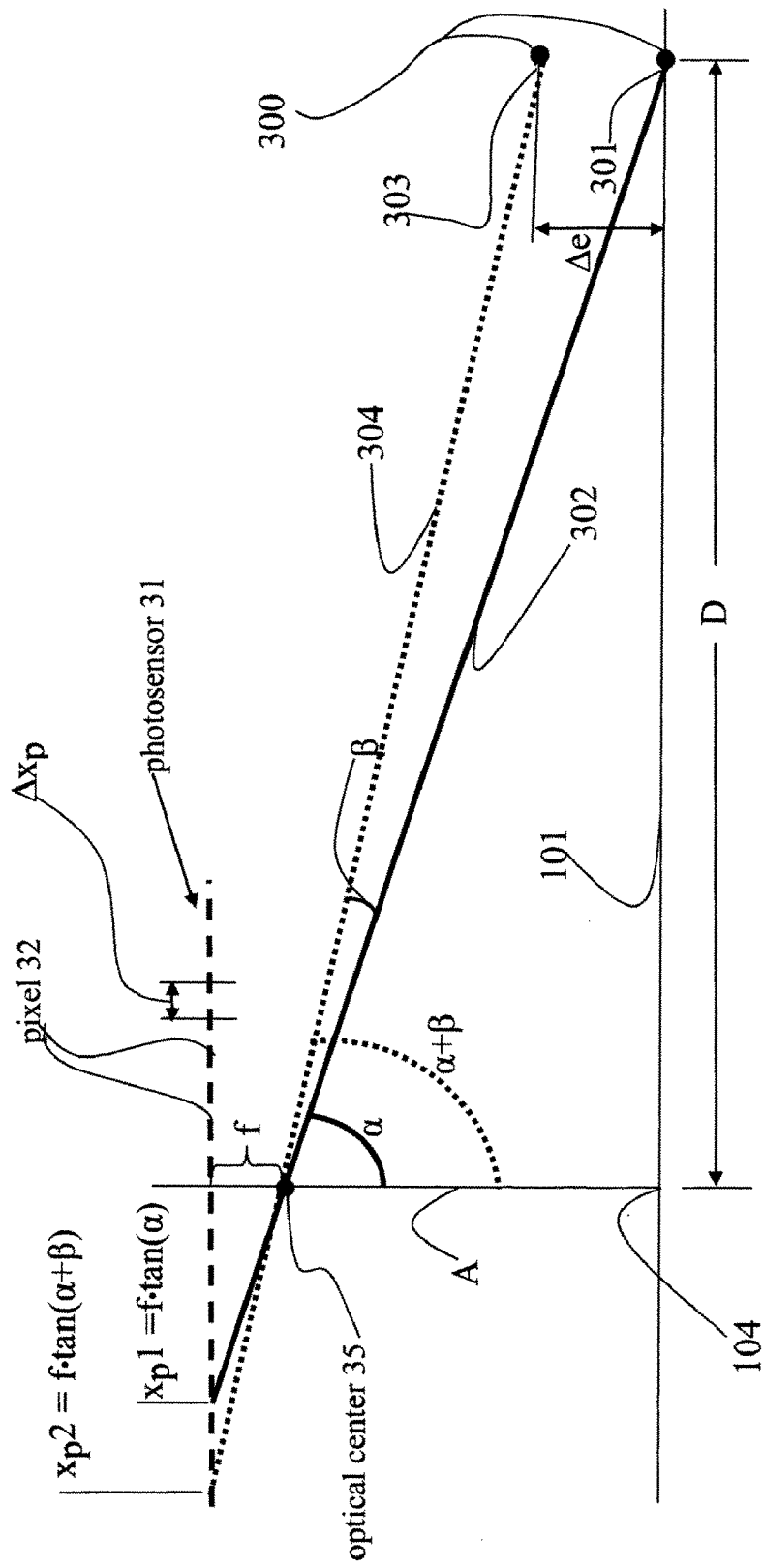
FIG. 3 schematically illustrates imaging geometry relevant for determining a constraint on accuracy of elevation data comprised in a reference image set, in accordance with an embodiment of the invention.

FIG. 3 schematically illustrates how a given uncertainty "Δe" in elevation of a feature 300 generates uncertainty in location of an image of the feature on photosensor 31 of camera array 30 in HICAM 20 (FIGS. 1B and 1C). Camera array 30 has an optical center 35, optical axis 39, and focal length "f". HICAM 20 is assumed to be at an altitude, A, above ground 101, and optical axis 39 intersects the ground at a plumb point 104. If feature 300 is located on ground 101 a location 301 a distance D from plumb point 104 a central ray 302 from the feature passes through optical center 35 at an oblique imaging angle α with optical axis 39. The central ray is incident on photosensor 32 and feature 300 is imaged at an image coordinate $x_p1 = f \cdot \tan(\beta)$ in photosensor 31. If on the other hand feature 300 is located at location 303 a distance D from optic axis 39 but is elevated above ground by a distance Δe, a central ray 304 from the feature passes through optical center 35 at an angle (α+β) with optical axis 39. The central ray is incident on photosensor 32 and feature 300 is imaged at an image coordinate $x_p2 = f \cdot \tan(\alpha+\beta)$. A difference between the image coordinates $\Delta x_p = x_p2 - x_p1 \sim \Delta e \cdot f \cdot \sin \alpha / A$. Therefore if pixels 32 have a pitch "P" and it is desired to determine accuracy of location of an image of a feature to less than the pixel pitch P it may be advantageous for Δe to satisfy a constraint $P \geq \Delta e \cdot f \cdot \sin \alpha / A$.

By way of a numerical example if A=5000 m (meters), α=30°, f=100 mm (millimeters) and P is 10 μm (micrometers) then Δe is advantageously less than or equal to about 1 m. If the pitch P were 2 μm Δe would advantageously be less than about 20 cm.

It is noted that whereas in the above description a HICAM camera system was assumed to be mounted to a moving platform that is an aircraft, embodiments of the invention are not limited to use on aircraft or moving platforms. A HICAM may be mounted to and used for example on a land vehicle. Or, a HICAM camera system may be mounted to a stationary support that may for example be subject to vibrations generated by natural atmospheric or terrestrial phenomena, or manmade sources of vibration. The HICAM may be mounted to the stationary support so that HICAM has a fixed or changeable orientation.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. Apparatus for remote imaging of at least one region of interest (ROI) in a terrestrial area, the apparatus comprising:
   a camera array having a focal length f and a photo sensor comprising pixels characterized by a pixel pitch P that acquires a sequence of images of the terrestrial area, the images acquired from different 3D spatial locations and camera orientations;
   an inertial measurement unit (IMU) and satellite navigation system (GNSS) receiver that acquire data responsive to the 3D spatial locations and/or orientations of the camera array during acquisition of the sequence of images;
   a data base comprising a terrain map that provides elevation data having an uncertainty Δe that satisfies a constraint P≥Δe·f·sin α/A, where A is a maximum distance of the camera array from the terrestrial area and a is a maximum oblique angle at which the camera array images the terrestrial area; and
   a controller that:
      registers at least one image of the sequence of images to an orthographic image of the terrestrial area or another image of the sequence of images to determine corrections to the IMU and/or GNSS data;
      uses the corrected IMU and/or GNSS data to crop each image of the sequence to an ROI cropped image portion of the image that images an ROI of the at least one ROI; and
      registers each ROI cropped image portion to an orthographic image of the terrestrial area responsive to elevation data in the terrain image of the terrestrial area to stabilize the ROI cropped image portion so that a same feature in each of the ROI cropped image portions is located at a same location to within a distance of pitch P in each of the registered ROI cropped image portions.

2. The apparatus according to claim 1 wherein P is less than or equal to about 15 μm (micrometers).

3. The apparatus according to claim 2 wherein P is less than or equal to about 10 μm.

4. The apparatus according to claim 3 wherein P is less than or equal to about 3 μm.

5. The apparatus according to claim 1 wherein A is greater than or equal to about 500 m (meters).

6. The apparatus according to claim 5 wherein A is greater than or equal to about 5,000 m.

7. The apparatus according to claim 6 wherein A is greater than or equal to about 10,000 m.

8. The apparatus according to claim 1 wherein a number of the photosensor pixels is equal to or greater than about $10^9$.

9. The apparatus according to claim 8 wherein a number of the photosensor pixels is equal to or greater than about $5 \times 10^9$.

10. The apparatus according to claim 1 wherein the controller registers at least 1 of every 10 images of the terrestrial area acquired by the camera array to the orthographic image to determine corrections to the IMU and/or GNSS data.

11. The apparatus according to claim 10 wherein the controller registers at least 1 of every 5 images of the terrestrial area acquired by the camera array to the orthographic image to determine corrections to the IMU and/or GNSS data.

12. The apparatus according to claim 11 wherein the controller registers at least 1 of every 3 images of the terrestrial area acquired by the camera array to the orthographic image to determine corrections to the IMU and/or GNSS data.

13. The apparatus according to claim 1 wherein the camera array acquires images of the terrestrial area at a frequency greater than or equal to about 3 Hz.

14. The apparatus according to claim 1 wherein the controller samples data provided by the IMU at a frequency greater than or equal to about 100 Hz.

15. The apparatus according to claim 14 wherein the controller samples data provided by the IMU at a frequency greater than or equal to about 200 Hz.

16. The apparatus according to claim 1 wherein the controller samples data provided by the GNSS receiver at a frequency greater than or equal to about 1 Hz.

17. The apparatus according to claim 1 wherein the camera array comprises a camera that operates in a rolling shutter mode.

18. The apparatus according to claim 1 and comprising a database comprising data that the IMU and/or GNSS acquires.

19. The apparatus according to claim 1 wherein the camera array is stabilized by a two axis gimbal system.

20. The apparatus according to claim 1 wherein the camera array is not stabilized by gimbal system.

* * * * *